United States Patent
Powell

(10) Patent No.: US 8,671,915 B2
(45) Date of Patent: Mar. 18, 2014

(54) FUEL PUMP MODULE INCLUDING A FLANGE GROOVE ROD ATTACHMENT

(75) Inventor: Patrick Powell, Farmington Hills, MI (US)

(73) Assignees: DENSO International America, Inc., Southfield, MI (US); Denso Corporation, Kariya-shi, Aichi-ken (JP)

( * ) Notice: Subject to any disclaimer, the term of this patent is extended or adjusted under 35 U.S.C. 154(b) by 417 days.

(21) Appl. No.: 13/050,994

(22) Filed: Mar. 18, 2011

(65) Prior Publication Data

US 2012/0234414 A1 Sep. 20, 2012

(51) Int. Cl.
F02M 37/04 (2006.01)

(52) U.S. Cl.
USPC .......................................... 123/509

(58) Field of Classification Search
USPC .......................................... 123/509; 220/562
See application file for complete search history.

(56) References Cited

U.S. PATENT DOCUMENTS

| | | | | |
|---|---|---|---|---|
| 4,945,884 A * | 8/1990 | Coha et al. | | 123/509 |
| 5,080,077 A * | 1/1992 | Sawert et al. | | 123/514 |
| 6,213,100 B1 * | 4/2001 | Johansen | | 123/509 |
| 6,505,644 B2 | 1/2003 | Coha et al. | | |
| 6,612,458 B2 | 9/2003 | Balzer et al. | | |
| 6,837,222 B2 * | 1/2005 | Okazono et al. | | 123/509 |
| 6,923,164 B1 * | 8/2005 | Mitsudou et al. | | 123/509 |
| 6,981,490 B2 | 1/2006 | Nagata et al. | | |
| 7,168,416 B2 | 1/2007 | Powell et al. | | |
| 7,216,633 B2 | 5/2007 | Attwood et al. | | |
| 7,219,658 B2 * | 5/2007 | Torii | | 123/509 |
| 7,249,594 B2 * | 7/2007 | Hashiguchi | | 123/509 |
| 7,305,973 B2 * | 12/2007 | Okazono et al. | | 123/509 |
| 7,389,768 B2 * | 6/2008 | Hayakawa et al. | | 123/509 |
| 7,398,769 B2 * | 7/2008 | Athalye | | 123/509 |
| 7,415,974 B2 * | 8/2008 | Akiba et al. | | 123/509 |
| 7,458,365 B2 * | 12/2008 | Hazama | | 123/509 |
| 7,472,693 B2 * | 1/2009 | Izutani et al. | | 123/509 |
| 7,523,745 B2 * | 4/2009 | Troxler et al. | | 123/509 |
| 7,546,833 B2 | 6/2009 | Tomomatsu et al. | | |
| 7,628,143 B2 * | 12/2009 | Yamada et al. | | 123/509 |
| 7,690,362 B2 * | 4/2010 | Pike et al. | | 123/516 |
| 7,757,671 B2 * | 7/2010 | Danjo et al. | | 123/509 |
| 7,800,883 B2 * | 9/2010 | Nederegger | | 361/215 |
| 2004/0000516 A1 * | 1/2004 | Okabe et al. | | 210/416.4 |
| 2004/0037714 A1 * | 2/2004 | Koba et al. | | 417/360 |
| 2004/0168678 A1 * | 9/2004 | Yamada et al. | | 123/509 |

* cited by examiner

Primary Examiner — Thomas Moulis
(74) Attorney, Agent, or Firm — Harness, Dickey & Pierce, P.L.C.

(57) ABSTRACT

A fuel pump module may include a reservoir, a flange, and a rod. The reservoir may be configured to contain fuel. The flange may be configured to rest on a surface about a hole in a fuel tank, and the flange may include a groove disposed on an underside surface of the flange. The rod may be inserted into the groove and may couple the flange to the reservoir.

20 Claims, 5 Drawing Sheets

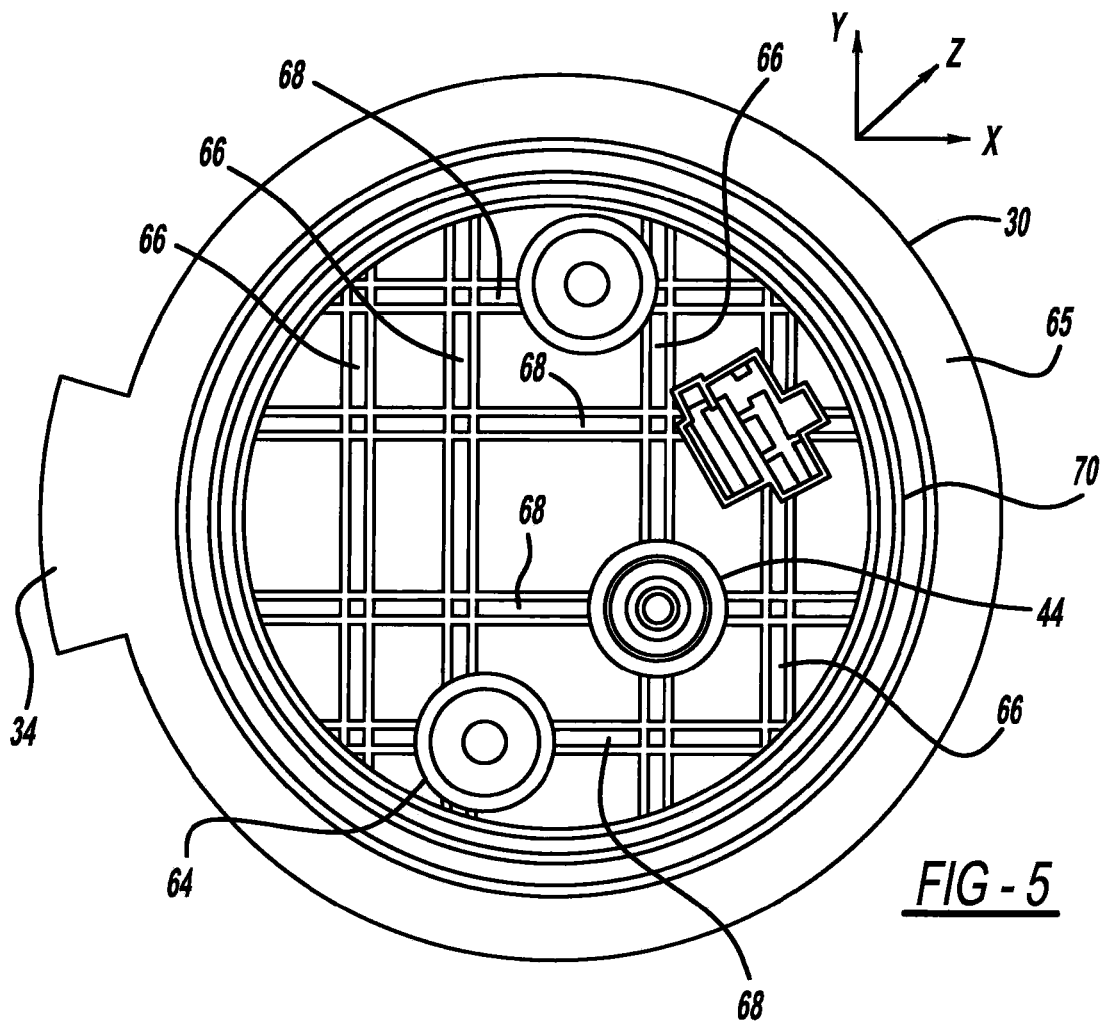
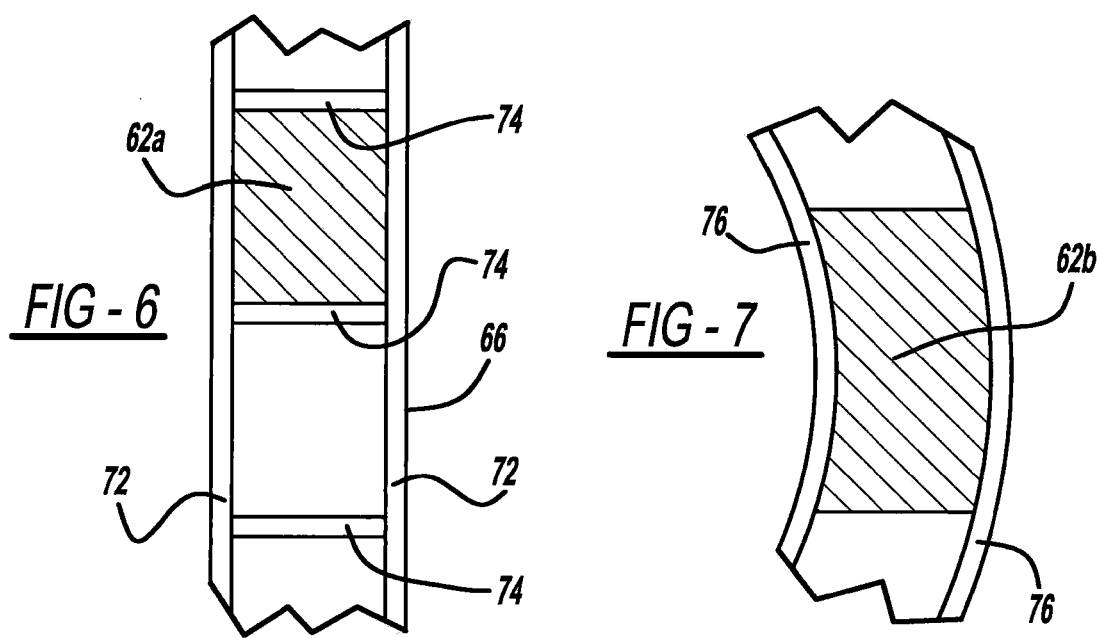

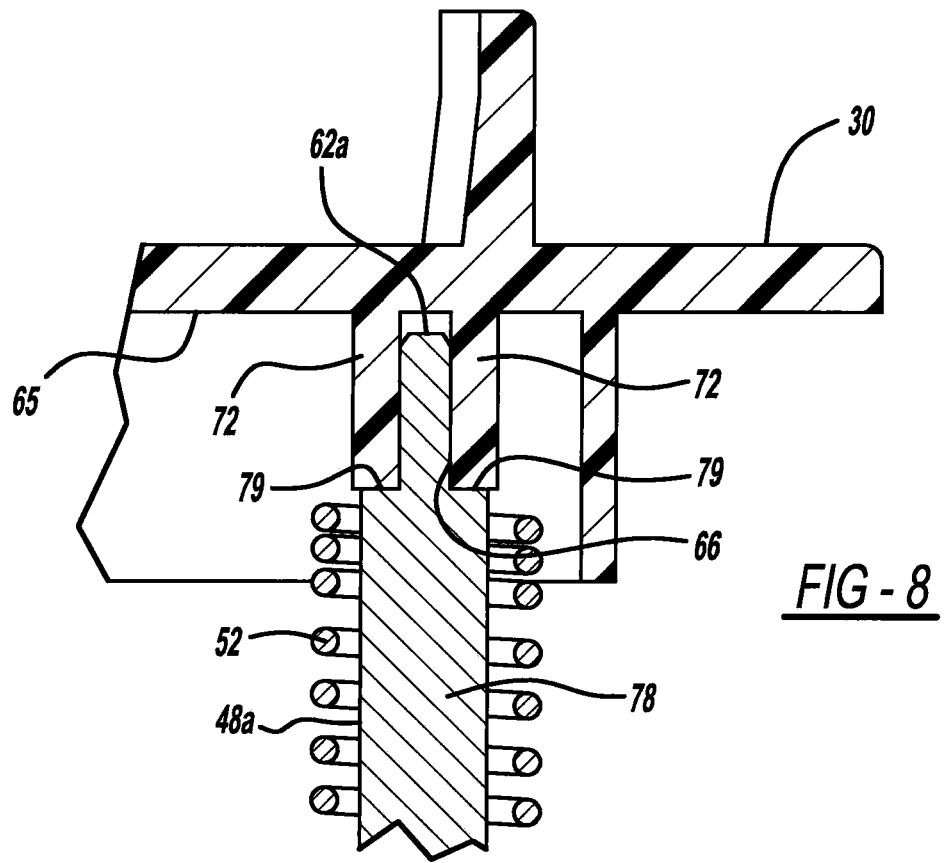
*FIG - 8*
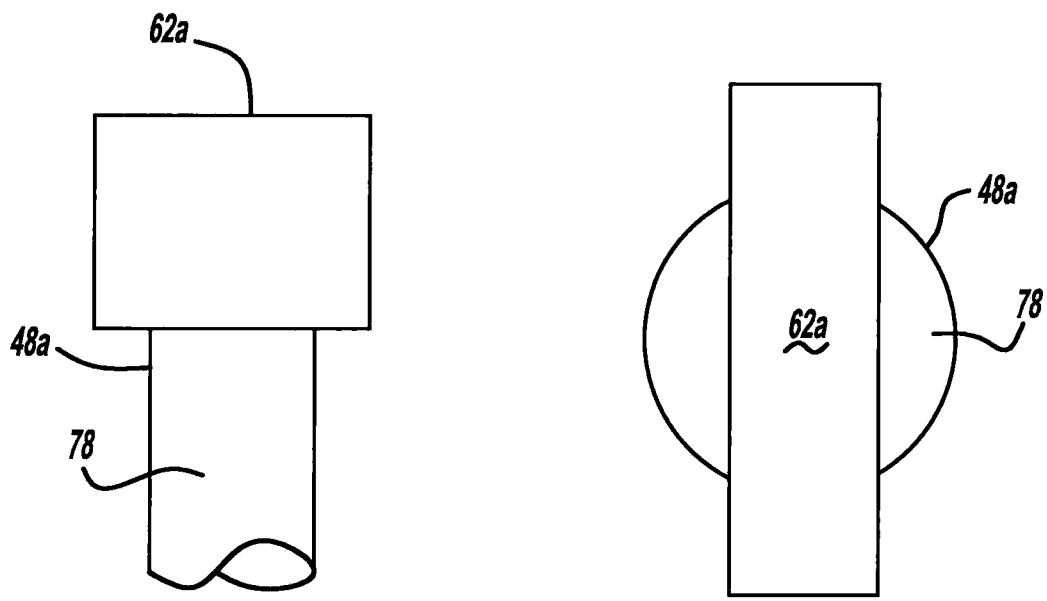
*FIG - 9*  *FIG - 10*

FUEL PUMP MODULE INCLUDING A FLANGE GROOVE ROD ATTACHMENT

FIELD

The present disclosure relates to fuel pump modules, and more particularly, to fuel pump modules including a flange groove rod attachment.

BACKGROUND

This section provides background information related to the present disclosure which is not necessarily prior art. Fuel pump modules typically include a flange that covers a hole in the top of a fuel tank and rests on the surface surrounding the hole. The underside surface of the flange defines sockets receiving upper ends of rods that couple a reservoir to the flange. The reservoir defines sockets receiving lower ends of the rods, and houses a fuel pump that pumps fuel from the fuel tank. The flange is shaped similar to a round plate, and the reservoir is shaped similar to a bucket and is positioned directly below the flange.

Due to packaging constraints in certain vehicle applications, it may be desirable to change the position of the reservoir relative to the flange. However, changing the position of the reservoir relative to the flange may require redesigning the flange and the reservoir to change the position of the sockets receiving the rods. Redesigning the flange and the reservoir will result in design costs and tooling costs that increase the cost of producing a fuel pump module for a specific vehicle application.

SUMMARY

This section provides a general summary of the disclosure, and is not a comprehensive disclosure of its full scope or all of its features. A fuel pump module may include a reservoir, a flange, and a rod. The reservoir may be configured to contain fuel. The flange may be configured to rest on a surface about a hole in a fuel tank, and the flange may include a groove disposed on an underside surface of the flange. The rod may be inserted into the groove and may couple the flange to the reservoir.

The flange and the groove may be integrally molded, and the rod may be press fitted into the groove. The groove may include a longitudinal groove extending parallel to a longitudinal axis of the flange, a lateral groove extending parallel to a lateral axis of the flange, and/or a circular groove extending around a vertical axis of the flange. The rod may include a non-cylindrical end inserted between sidewalls defining the groove. The non-cylindrical end may engage the sidewalls of the groove along a length of the non-cylindrical end. The rod may be cold pressed to form the non-cylindrical end. The distance between the sidewalls of the groove may be approximately equal to a width of the non-cylindrical end.

The fuel pump module may also include partitions positioned in the groove perpendicular to the sidewalls, and a distance between the partitions may be approximately equal to a length of the non-cylindrical end of the rod. The non-cylindrical end of the rod may have a rectangular cross section, a C-shaped cross section, or an S-shaped cross section. The rod may include a rounded transition from the non-cylindrical end to a cylindrical portion of the rod. The fuel pump module may also include a stop disposed in a slot extending around a perimeter of the rod, the stop preventing the rod from backing out of a socket of the reservoir in which the rod is disposed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 is a bottom view of a fuel pump module flange depicting grooves for receiving rods that couple the flange to a fuel pump module reservoir;

FIG. 6 is a sectioned bottom view of a straight groove in an underside surface of a fuel pump module flange, a rod inserted into the straight groove, and partitions disposed in the straight groove to secure the rod;

FIG. 7 is a sectioned bottom view of a curved groove in an underside surface of a flange and a rod inserted into the curved groove;

FIG. 8 is a sectioned side view of a fuel pump module flange defining a groove, a rod inserted into the groove, and a spring encircling the rod;

FIG. 9 is a side view of a rod having a flattened end for insertion into grooves defined in an underside surface of a fuel pump module flange;

FIG. 10 is a top view of the rod of FIG. 9;

Corresponding reference numerals indicate corresponding parts throughout the several views of the drawings.

DETAILED DESCRIPTION

Example embodiments will now be described more fully with reference to FIGS. 1-14 of the accompanying drawings. Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top," "bottom," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
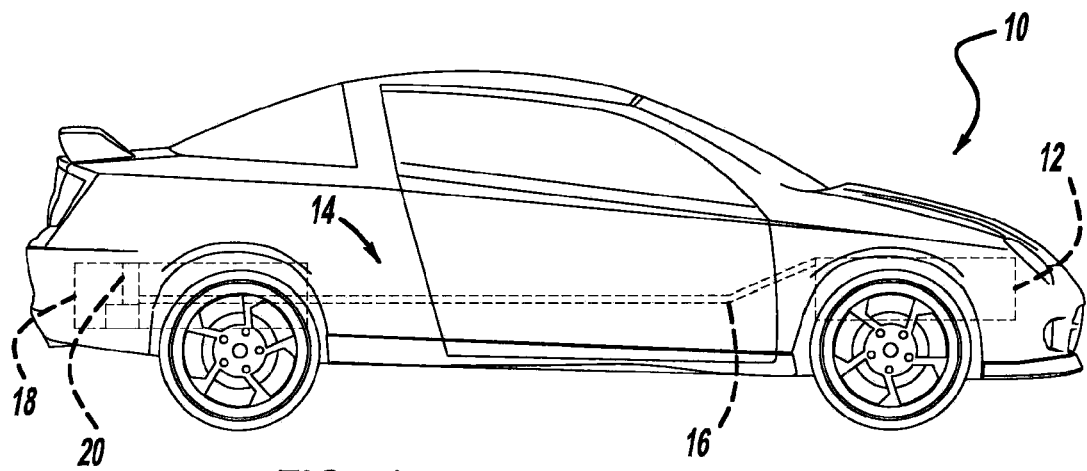
FIG. 1 is a side view of a vehicle depicting a location of a vehicle fuel system.

Referring first to FIG. 1, a vehicle 10, such as an automobile, includes an engine 12 and a fuel system 14. The fuel system 14 includes a fuel supply line 16, a fuel tank 18, and a fuel pump module 20. The fuel pump module 20 mounts within the fuel tank 18 with a flange and is normally submerged in or surrounded by varying amounts of liquid fuel within the fuel tank 18 when the fuel tank 18 contains liquid fuel. A fuel pump within the fuel pump module 20 pumps fuel to the engine 12 through the fuel supply line 16.

Figure 2:
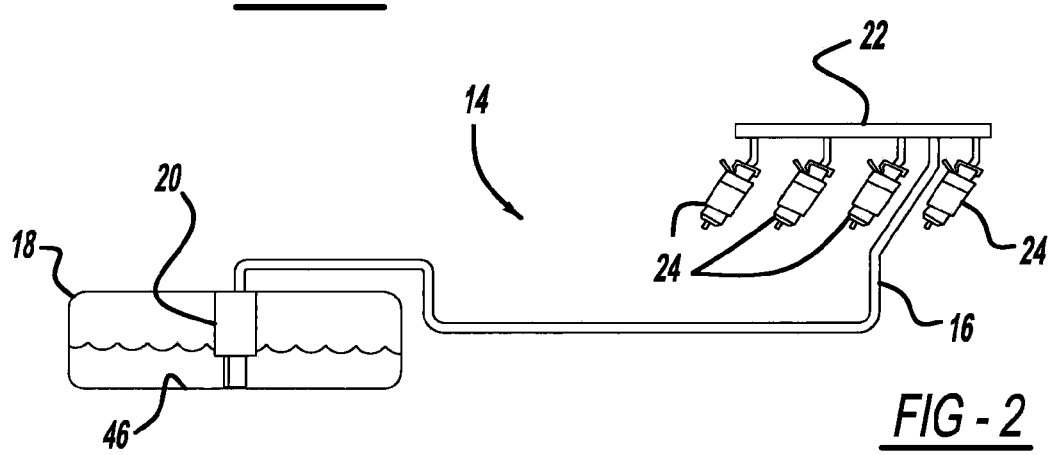
FIG. 2 is a side view of a vehicle fuel system depicting a fuel pump module within a fuel tank.

Referring now to FIG. 2, the fuel system 14 includes a fuel rail 22 and fuel injectors 24. In a returnless fuel system, only the fuel supply line 16 carries fuel between the fuel pump module 20 and the fuel rail 22. Once the fuel reaches the fuel rail 22, also called a "common rail," as depicted in FIG. 2, the fuel passes into the individual fuel injectors 24 before being sprayed or injected into individual combustion chambers of the engine 12. The fuel system 14 depicted in FIG. 2 has no fuel return line from the fuel rail 22 to the fuel tank 18.

Figure 3:
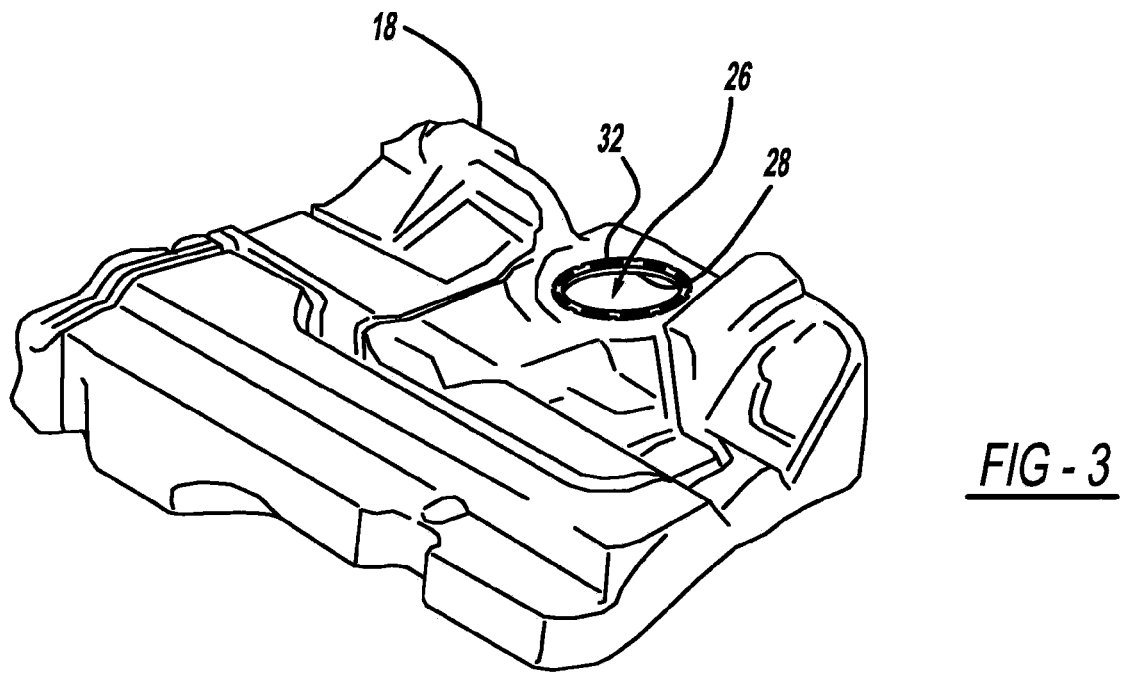
FIG. 3 is a perspective view of a fuel tank depicting an aperture for installation of a fuel pump module.
Figure 4:
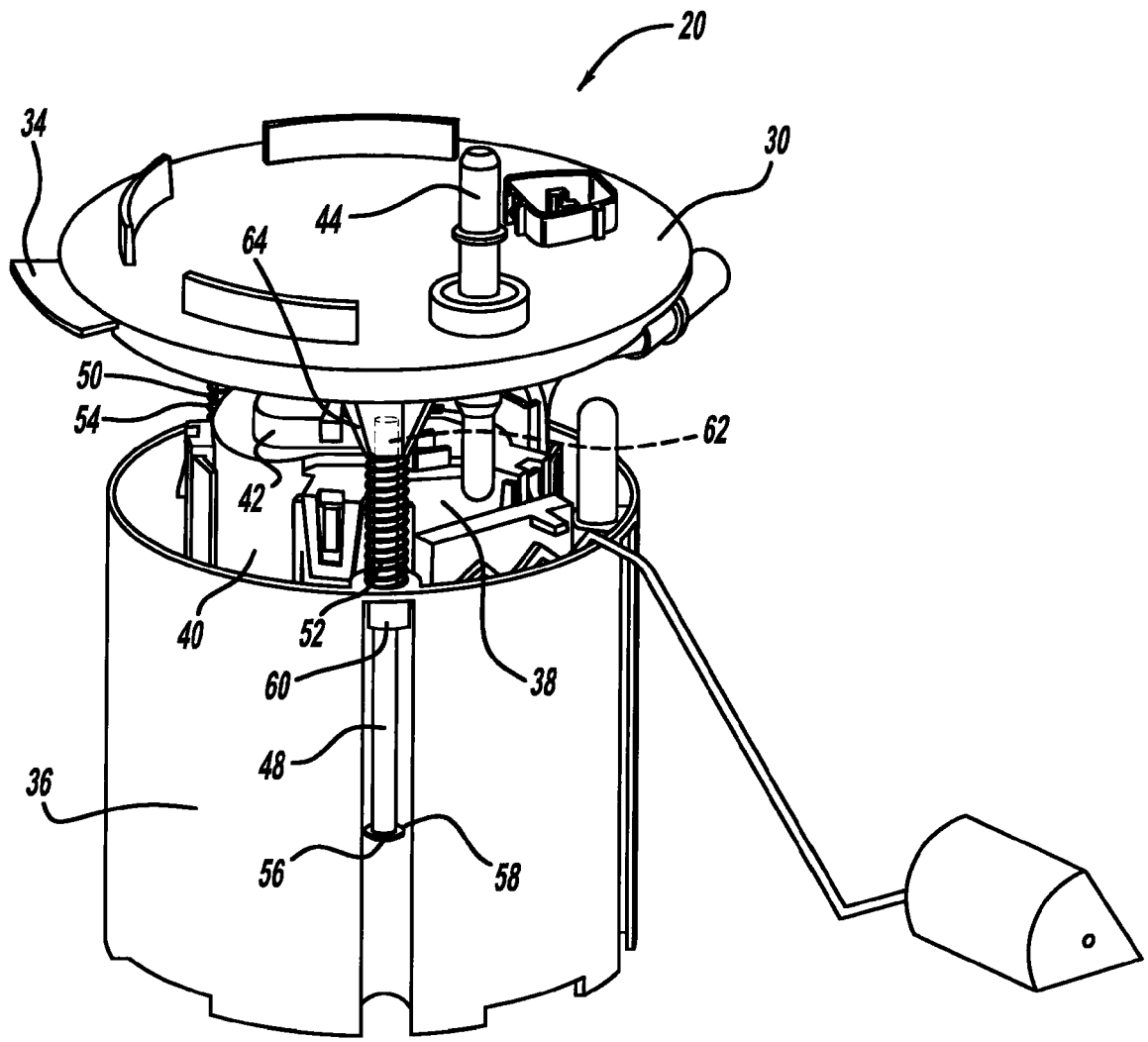
FIG. 4 is a perspective view of a fuel pump module depicting a flange for mounting the fuel pump module within an aperture of a fuel tank.

With continued reference to FIG. 2, and additional reference to FIGS. 3 and 4, the fuel tank 18 has a mounting location 26, a hole, about which is a mounting surface 28 on the top of the fuel tank 18 for the fuel pump module 20. The fuel pump module 20 may be lowered through the hole of the mounting location 26 on top of the fuel tank 18 when installed. More specifically, a fuel pump module flange 30 rests on the mounting surface 28 when the fuel pump module 20 is in its installed position. The fuel tank 18 includes retaining feature 32, such as a lip, that retains the flange 30 at the mounting location 26 by, for example, engaging a tab 34 on the flange 30.

Additionally, the fuel pump module 20 includes a generally vertical cylindrical reservoir 36. Alternatively, the reservoir 36 may be oriented generally horizontally (not shown). An advantage of a horizontal reservoir is that less fuel tank depth is necessary to accommodate the reservoir. Alternatively, an advantage of a vertical reservoir is that less horizontal space is necessary for its installation and the reservoir itself may be firmly biased against the bottom interior of the fuel tank. That is, generally a vertical reservoir may have a smaller overall diameter than a horizontal reservoir for the same vehicle application.

The fuel pump module 20 includes at least one fuel pump 38 that draws fuel from the reservoir 36 and through a filter sock 40 and, in one example, through a fuel pump check valve 42 that may disposed at or near the top of the fuel pump 38. The fuel pump check valve 42 opens in response to positive pressure from within the fuel pump 38 to permit fuel to flow from the top of the fuel pump and into the fuel supply line 16 via a fuel supply line port 44. To successfully pump fuel as generally described above, the fuel pump module 20 resides secured against a bottom interior surface 46 of the fuel tank 18, as shown in FIG. 2. To maintain its secured position against the bottom interior surface 46 of the fuel tank 18, the fuel pump module 20 utilizes a first rod 48 and a second rod 50. More specifically, the first rod 48 may be surrounded by a first spring 52 and the second rod 50 may be surrounded by a second spring 54. Because the rods 48, 50 function in the same manner, only the first rod 48 will be used to exemplify details of the disclosure.

A first end 56 of the first rod 48 may be secured to the reservoir 36 in some fashion, such as by using a press fit into a portion of the reservoir 36, or by crimping the first end 56 or installing a stop 58, such as a washer, at the first end 56 after passing it through part of the reservoir 36, such as a socket 60, to prevent the first end 56 from backing out of the socket 60. A second end 62 of the first rod 48 may be secured to the flange 30 such as by a press or snap fit. For example, the flange 30 may include a socket 64, and the second end 62 may be press fitted into the socket 64. Additionally, the flange 30 may define grooves, and the second end 62 may be press fitted into the grooves. Second end 62 may have a flat end that is press fit into the groove, which may have flat walls or surfaces to contact flat surfaces of the flat end of the second end 62. Thus, with the flat end and opposite end of the rod, the rod may couple the flange to the reservoir.

Referring now to FIG. 5, disposed on an underside surface 65 of the flange 30 may be one or more straight grooves, such as longitudinal grooves 66 or lateral grooves 68, and/or one or more curved grooves, such as a circular groove 70. The longitudinal grooves 66 extend parallel to a longitudinal axis y of the flange 30, the lateral grooves 68 extend parallel to a lateral axis x of the flange 30, and the circular groove 70 extends around a vertical axis z of the flange 30. The grooves 66, 68, and 70 may be integrally molded with or molded to the flange 30.

The longitudinal grooves 66 and the lateral grooves 68 may intersect, as shown, and the circular groove 70 may surround the longitudinal grooves 66 and the lateral grooves 68. Sidewalls defining the longitudinal grooves 66 and the lateral grooves 68 may extend through the intersections between the longitudinal grooves 66 and the lateral grooves 68, as shown. Alternatively, the sidewalls may not extend through the intersections between the longitudinal grooves 66 and the lateral grooves 68.

The second end 62 of the first rod 48 may be press fitted into any one of number of locations within the longitudinal grooves 66, the lateral grooves 68, or the circular groove 70. The second end 62 of the first rod 48 may be cylindrical, or the second end 62 may have a non-cylindrical shape that retains the first rod 48 in the longitudinal grooves 66, the lateral grooves 68, or the circular groove 70. For example, the second end 62 may be shaped to conform to the longitudinal grooves 66, the lateral grooves 68, or the circular groove 70. In addition, the second end 62 may engage sidewalls of the grooves 66, 68, or 70 along the length of the second end 62. Briefly referring again to FIG. 4, the second end 62 of the first rod 48 may be inserted into a different location within the grooves 66, 68, or 70 to modify the position of the reservoir 36 relative to the flange 30 without redesigning the flange 30.

Referring now to FIG. 6, a first rod 48a may have a second end 62a with a rectangular cross section. The second end 62a of the first rod 48a may be press fitted into any one of the straight grooves, but for illustration purposes, the second end 62a of the first rod 48a is shown inserted into one of the longitudinal grooves 66. Before the second end 62a of the first rod 48a is inserted into one of the longitudinal grooves 66, the distance between sidewalls 72 defining the longitudinal grooves 66 may be equal to or less than the width of the second end 62a of the first rod 48a. Thus, when the second end 62a of the first rod 48a is inserted between the sidewalls 72 of one of the longitudinal grooves 66, the sidewalls 72 may engage the second end 62a of the first rod 48a to create a press or snap fit.

Walls or partitions 74 may be disposed in the longitudinal grooves 66 to retain the second end 62a of the first rod 48a in the longitudinal grooves 66. The distance between the partitions 74 may be approximately equal to the length of the rectangular cross section. Thus, the sidewalls 72 and the partitions 74 may engage the second end 62a of the first rod 48a to create a press or snap fit.

Referring now to FIG. 7, a first rod 48b may have a second end 62b with a C-shaped cross section. The second end 62b of the first rod 48b may be press fitted into the circular groove 70. The distance between sidewalls 76 defining the circular groove 70 may be approximately equal to the width of the second end 62b. In addition, the curvature of the sidewalls 76 may match the curvature of the second end 62b of the first rod 48b. Thus, the second end 62b of the first rod 48b may be inserted between the sidewalls 76 of the circular groove 70, and the sidewalls 76 may engage to the second end 62b to create a press or snap fit.

Referring now to FIG. 8, the second end 62a of the first rod 48a is shown inserted into one of the longitudinal grooves 66 in the underside surface 65 of the flange 30. Although FIG. 8 illustrates the fit between the second end 62a of the first rod 48a and one of the longitudinal grooves 66 in the flange 30, the fit between other variations of the second end 62 of the first rod 48 and the grooves 66, 68, or 70 may be similar. The first rod 48a may include a cylindrical portion 78 adjacent to the second end 62a and a shoulder 79 at the transition from the second end 62a to the cylindrical portion 78. The first rod 48a may be inserted into the longitudinal grooves 66 until the shoulder 79 abuts the sidewalls 72.

Referring now to FIGS. 9 and 10, the first rod 48a having the second end 62a with the rectangular cross section is illustrated in more detail. The first rod 48a may be a metal rod and the second end 62a of the first rod 48a may be cold pressed to form the rectangular cross section. In this regard, the second end 62a may have a width that is less than the diameter of the cylindrical portion 78 and a length that is greater than the diameter of the cylindrical portion 78.

Figure 11:
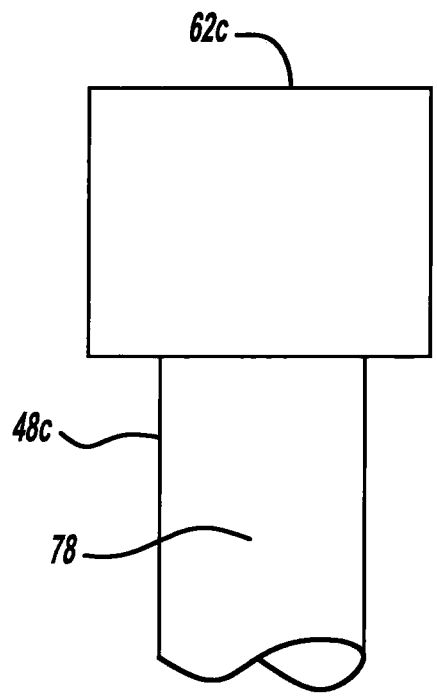
FIG. 11 is a side view of a rod having an S-shaped end for insertion into grooves in an underside surface of a fuel pump module flange.
Figure 12:
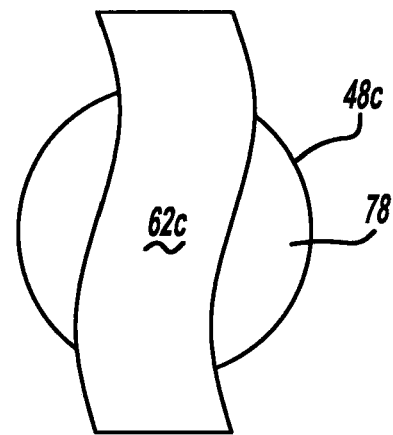
FIG. 12 is a top view of the rod of FIG. 11.

Referring now to FIGS. 11 and 12, a first rod 48c may have a second end 62c with an S-shaped cross section. The second end 62c of the first rod 48c may be inserted into straight grooves, such as the grooves 66 or 68 of FIG. 5, and the difference between the shape of the second end 62c and the shape of the grooves 66 or 68 may create a press or snap fit. Alternatively, the second end 62c of the first rod 48c may be inserted into grooves having a serpentine shape that substantially conforms to the shape of the second end 62c.

Figure 13:
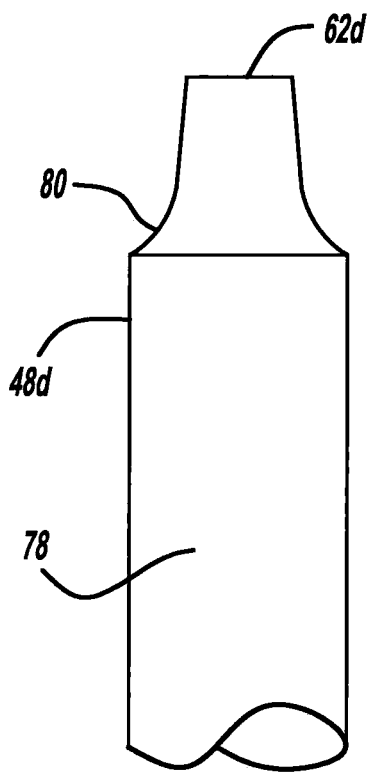
FIG. 13 is a side view of a rod having a flattened end and a rounded transition from the flattened end to a cylindrical portion of the rod.
Figure 14:
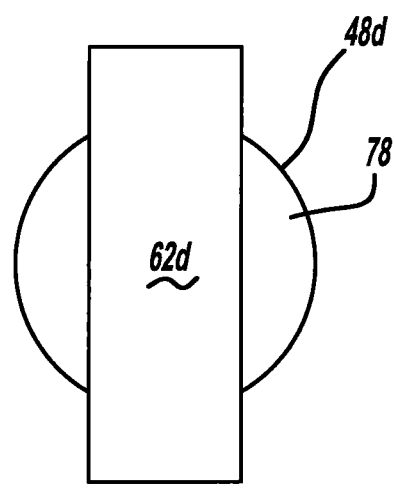
FIG. 14 is a top view of the rod of FIG. 13.

Referring now to FIGS. 13 and 14, a first rod 48d may have a second end 62d with a rectangular cross section, the cylindrical portion 78, and a rounded transition 80 from the cylindrical portion 78 to the second end 62d. The second end 62d of the first rod 48d may be inserted into straight grooves, such as the grooves 66 or 68 of FIG. 5. As the second end 62d is inserted into the grooves and the grooves engage the rounded transition 80 of the first rod 48, the interference fit between the second end 62d and the grooves becomes tighter.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fuel pump module, comprising:
a reservoir configured to contain fuel;
a flange configured to rest on a surface about a hole in a fuel tank, the flange including a groove disposed on an underside surface of the flange; and
a rod inserted into the groove and coupling the flange to the reservoir; wherein
the rod may be inserted into a plurality of locations along the groove.

2. The fuel pump module of claim 1, wherein the rod is press fitted into the groove.

3. The fuel pump module of claim 1, wherein the groove comprises a longitudinal groove extending along a longitudinal axis of the flange.

4. The fuel pump module of claim 1, wherein the groove comprises a lateral groove extending along a lateral axis of the flange.

5. The fuel pump module of claim 1, wherein the groove includes a circular groove extending around a vertical axis of the flange.

6. The fuel pump module of claim 1, wherein the rod includes a non-cylindrical end inserted between sidewalls defining the groove.

7. The fuel pump module of claim 6, wherein the non-cylindrical end engages the sidewalls of the groove along a length of the non-cylindrical end.

8. The fuel pump module of claim 6, wherein the rod is cold pressed to form the non-cylindrical end.

9. The fuel pump module of claim 6, wherein a distance between the sidewalls of the groove is approximately equal to a width of the non-cylindrical end.

10. The fuel pump module of claim 6, further comprising partitions positioned in the groove perpendicular to the sidewalls, wherein a distance between the partitions is approximately equal to a length of the non-cylindrical end.

11. The fuel pump module of claim 6, wherein the non-cylindrical end has a rectangular cross section.

12. The fuel pump module of claim 6, wherein the non-cylindrical end has a C-shaped cross section.

13. The fuel pump module of claim 6, wherein the non-cylindrical end has an S-shaped cross section.

14. The fuel pump module of claim 6, wherein the rod includes a rounded transition from the non-cylindrical end to a cylindrical portion of the rod.

15. The fuel pump module of claim 6, further comprising a stop installed adjacent to a cylindrical end of the rod opposite the non-cylindrical end, the stop preventing the rod from backing out of a socket of the reservoir in which the rod is disposed.

16. A fuel pump module, comprising:
a reservoir configured to contain fuel;
a flange configured to rest on a surface about a hole in a fuel tank, the flange including a groove disposed on an underside surface of the flange; and
a rod having a flat end press fit into the groove, the rod coupling the flange to the reservoir; wherein
the flat end of the rod may be fit into a plurality of locations along the groove.

17. A flange for a fuel pump module, comprising:
a plate configured to rest on a surface about a hole in a fuel tank; and a groove disposed on an underside surface of the plate and configured to receive a rod that couples the flange to a reservoir of the fuel pump module; wherein the rod may be received at a plurality of locations along the groove to couple the flange to the reservoir of the fuel pump.

18. The flange of claim 17, wherein a distance between sidewalls defining the groove is approximately equal to a thickness of the rod.

19. The flange of claim 17, wherein a distance between sidewalls defining the groove is less than a thickness of the rod.

20. The flange of claim 17, wherein a plurality of intersecting straight grooves, and a curved groove surrounding the plurality of intersecting straight grooves are disposed on the underside of the plate.

* * * * *